Figure 1:
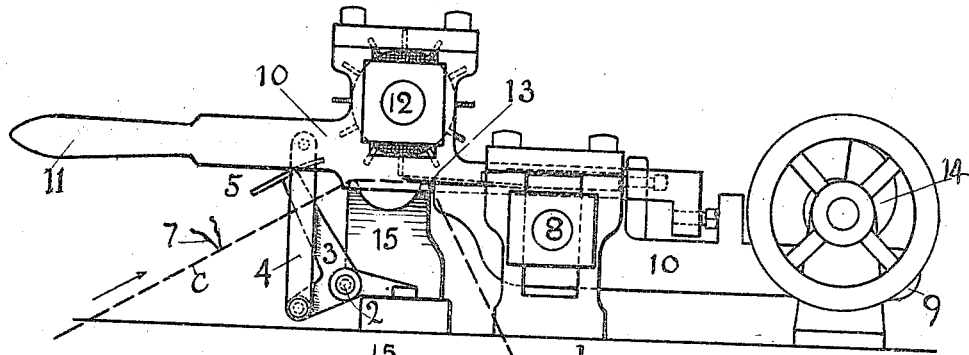

J. BROMAN.
SEAM PROTECTING DEVICE FOR CLOTH SHEARING MACHINES.
APPLICATION FILED JAN. 31, 1917.

1,255,980.

Patented Feb. 12, 1918.

Inventor—
John Broman
By Chas. H. Burleigh
Attorney.

UNITED STATES PATENT OFFICE.

JOHN BROMAN, OF WORCESTER, MASSACHUSETTS, ASSIGNOR TO CURTIS & MARBLE MACHINE COMPANY, OF WORCESTER, MASSACHUSETTS, A CORPORATION OF MASSACHUSETTS.

SEAM-PROTECTING DEVICE FOR CLOTH-SHEARING MACHINES.

1,255,980.    Specification of Letters Patent.    Patented Feb. 12, 1918.

Application filed January 31, 1917. Serial No. 145,796.

*To all whom it may concern:*

Be it known that I, JOHN BROMAN, a citizen of the United States, residing at Worcester, in the county of Worcester and State of Massachusetts, have invented certain new and useful Improvements in Seam-Protecting Devices for Cloth-Shearing Machines, of which the following is a specification.

Preparative to the shearing process it is the usual practice to sew or otherwise secure the ends of the several pieces of fabric together, for affording a long length of goods to be passed through the machine. This sewing is usually from one inch to two inches, more or less, from the extreme end of the goods; thus leaving loose projecting ends outside the attaching seam. These ends are termed "headings" and the edges thereof are sometimes more or less frayed or uneven. Should this heading, during the passage of the cloth through the machine, come in contact with the cutting mechanism, the fabric may be damaged; also the cutting mechanism is liable to be thrown out of adjustment, or the blades may become strained or bent.

During the shearing action the point of contact between the revolving cutter and the stationary blade is adjacent to the surface of the fabric, which is drawn taut over the rest, so that any projecting threads or materials will be sheared off on the line of the ledger, this being the shearing or cutting position. The seams and headings as they pass over the rest, are above this position; consequently it is essential to raise the shearing mechanism to allow the headings to pass under the cutters.

It is customary to lift the cutting mechanism from the shearing position when the heading approaches and passes over the rest or supporting member; and means of different character have sometimes been provided on cloth-shearing machines for that purpose. With long headings the usual lifting is not alone sufficient to clear the longer headings and prevent their being caught by the cutters, in a way which is liable to damage the fabric; especially with light goods. Hence my invention relates to a protector or guard to be interposed between the line of the cloth and the cutting mechanism, the in- the lifting of the cutting parts, and automatically effected by, or in connection with the movement of the cutter supporting frame.

A prime object of my invention is to provide a device to be placed on a cloth shearing machine that, operated in connection with a revolver-supporting-frame, will when desired, interpose a protecting plate between the surface of the cloth and the cutting mechanism; and to insure the insertion and withdrawal of the protecting guard synchronously with the movement up and down of the revolver-supporting frame.

Another object is to furnish a device operating with the shifting of the cutting parts in a cloth shearing machine, that will protect the piece-connecting seams and cause loose headings or any projecting portion, to lie close to the face of the fabric while passing over the rest. Also, to prevent the suction draft means, when used, from drawing the headings up to the shearing cutters.

These objects I attain by mechanism constructed, combined and operated in the peculiar manner explained; the particular subject matter claimed being definitely expressed in the summary.

Figure 2:
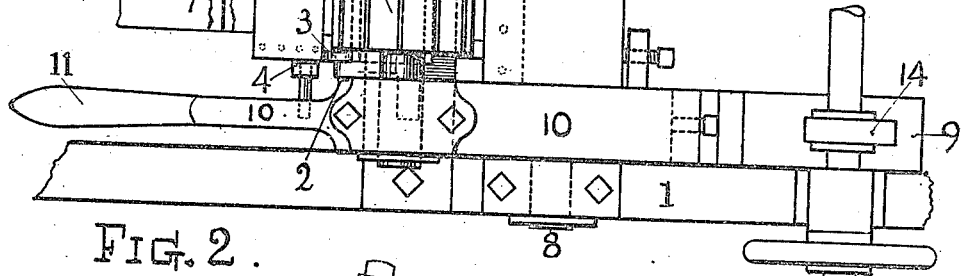
Figure 3:
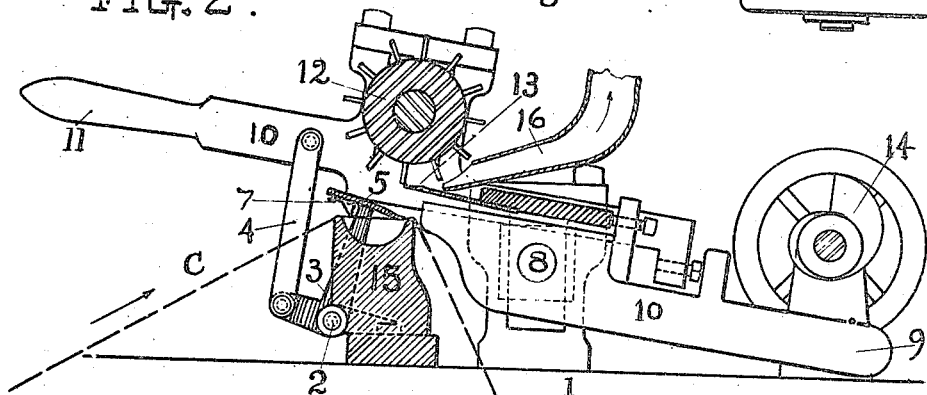

In the accompanying drawings, Figure 1 represents an end elevation view of such parts of a cloth-shearing mechanism as will illustrate my invention. Fig. 2 is a top plan view at one end of the shear mechanism, and Fig. 3 is a vertical section across the rest, cutting devices and seam protector, showing the parts with the revolver-frame as elevated; and with added lines indicating the location of the suction-draft appliance, which in many instances is employed in cloth-shearing machines.

It will be understood that the cloth shearing machine to which my invention is adapted, may be of the usual or well known kind; and that the fabric is advanced past the cutting devices in the manner and by means such as heretofore employed. The machine need not, therefore, be herein shown and described, excepting such parts as have especial relation to the present improvements.

Referring to the drawing, the numeral 10 indicates the cutter-supporting frame which W. F. BROWN.
TIRE TOOL.
APPLICATION FILED MAR. 6, 1917.
1,255,981. Patented Feb. 12, 1918.
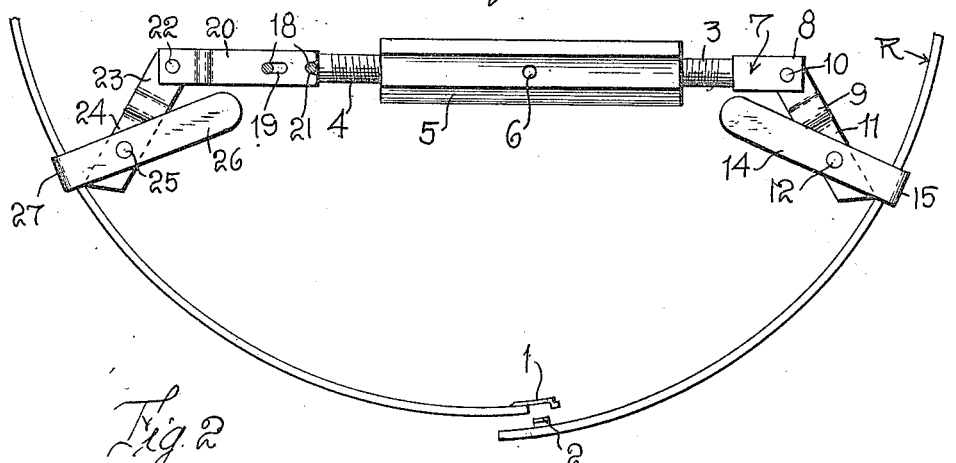
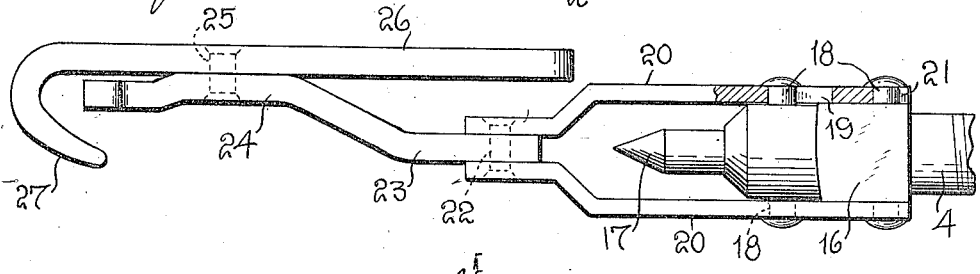
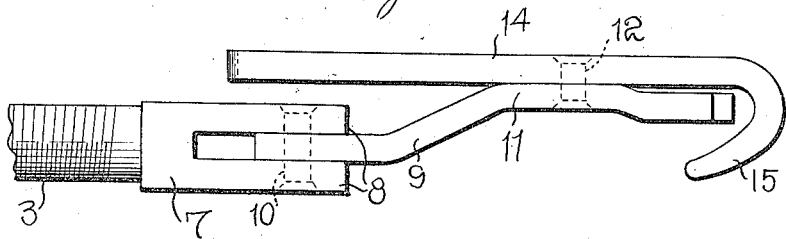
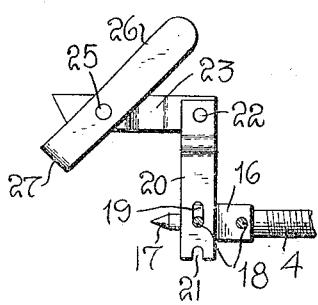
Inventor
W. F. BROWN.
By Watson E. Coleman
Attorney